(12) United States Patent
Fulton et al.

(10) Patent No.: US 7,813,816 B2
(45) Date of Patent: Oct. 12, 2010

(54) METHODS AND STRUCTURES FOR UTILIZING A MEMORY DEVICE FOR A PLC

(75) Inventors: Temple Luke Fulton, Elizabethton, TN (US); Mark Steven Boggs, Johnson City, TN (US); Steven Michael Hausman, Johnson City, TN (US); William H. Johnson, Johnson City, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 500 days.

(21) Appl. No.: 11/056,805

(22) Filed: Feb. 11, 2005

(65) Prior Publication Data

US 2005/0187988 A1 Aug. 25, 2005

Related U.S. Application Data

(60) Provisional application No. 60/546,153, filed on Feb. 20, 2004.

(51) Int. Cl.
*G05B 11/01* (2006.01)

(52) U.S. Cl. .......... 700/11; 702/183; 702/187; 712/200

(58) Field of Classification Search ............ 707/202; 700/11; 712/200; 702/187, 183
See application file for complete search history.

(56) References Cited

U.S. PATENT DOCUMENTS

| 4,493,083 | A | | 1/1985 | Kinoshita | 371/66 |
| 5,832,508 | A | * | 11/1998 | Sherman et al. | 707/200 |
| 6,438,651 | B1 | | 8/2002 | Slane | 711/118 |
| 6,701,284 | B1 | * | 3/2004 | Huntley et al. | 702/187 |
| 2004/0078551 | A1 | | 4/2004 | Lichtenfels | |
| 2004/0249606 | A1 | * | 12/2004 | Hoppes et al. | 702/183 |

FOREIGN PATENT DOCUMENTS

| DE | 4207086 C1 | | 10/1993 |
| DE | 10163206 A1 | | 7/2003 |
| GB | 1 563 812 | * | 4/1980 |

OTHER PUBLICATIONS

PCT International Search Report, mailed Sep. 1, 2005.
PCT Written Opinion.

* cited by examiner

*Primary Examiner*—Albert DeCady
*Assistant Examiner*—Tejal J Gami
(74) *Attorney, Agent, or Firm*—Jose de la Rosa

(57) ABSTRACT

Certain exemplary embodiments comprise a method comprising a plurality of activities comprising: at a programmable logic controller comprising a memory device, receiving a request to create a data log that is adapted to receive data from a process; initializing the data log by writing to the data log a head marker code in the record type field of a first record and an invalid code in the record type field of a last record of the data log, the last record logically preceding and logically adjacent to the first record.

13 Claims, 7 Drawing Sheets

2000

2100

| Date Stamp (0 or 3 bytes) | Time Stamp (0 or 3 bytes) | data…data (1 to 200 bytes) w/ds or ts: 1-197 w/ds and ts: 1 - 194 | cksum (2 bytes) | Record Type (1 byte) | |
|---|---|---|---|---|---|
| yy,mm,dd | hh,mm,ss | x…x | xxxx | 00 or 01 or 02 | 2200 |
| … | … | … | … | … | |
| yy,mm,dd | hh,mm,ss | x…x | xxxx | 00 or 01 or 02 | 2300 |

METHODS AND STRUCTURES FOR UTILIZING A MEMORY DEVICE FOR A PLC

CROSS-REFERENCES TO RELATED APPLICATIONS

This application claims priority to, and incorporates by reference herein in its entirety, U.S. Provisional Patent Application Ser. No. 60/546,153, filed 20 Feb. 2004, pending U.S. patent application Ser. No. 10/685,819, filed 15 Oct. 2003, pending U.S. patent application Ser. No. 10/685,521, filed 15 Oct. 2003, and pending U.S. patent application Ser. No. 10/622,259, filed 18 Jul. 2003.

BACKGROUND

A programmable logic controller (PLC) can utilize a memory device for storage. The memory device, which can be a memory cartridge, can be an electronically erasable programmable read only memory (EEPROM) device. The memory cartridge can be used to store configuration information for the PLC and/or data obtained by the PLC. Data obtained by the PLC can be stored in a log and/or database comprising a plurality of records.

Each record of the log can comprise a record type. The record type can be used by the PLC to locate and/or track the record that was added to the log last and/or a location where fields of a record will be populated next. Each time fields of a record are filled with new data, the record type of the record can be changed to show that it is a valid record but no longer the head of the log.

Initializing a data log can result in the transfer of a structure definition to the data log, but typically, no data is transferred to fill fields of records of the data log. Instead, at data log initialization, the PLC can set all record type fields in the data log to "invalid." Setting all record type fields in the data log to invalid can require considerable amounts of time for a large log.

SUMMARY

In certain exemplary embodiments, a replaceable memory cartridge can be used with a programmable logic controller. The memory cartridge can be adapted to store a data log. The data log can be initialized by writing a head marker code in the record type field of a first record and an invalid code in the record type field of a last record of the data log. The last record can be logically adjacent to the first record regardless of physical location. Fields of data log records can be filled with data sequentially. For example, responsive to collecting data to fill the first record, a head marker code can be written to the record type field of a second record, thereby automatically invalidating the second record. Data can be written to at least one field of the first record. The record type field of the first record can be overwritten with a code indicative of valid data.

BRIEF DESCRIPTION OF THE DRAWINGS

A wide variety of potential embodiments will be more readily understood through the following detailed description of certain exemplary embodiments, with reference to the accompanying exemplary drawings in which:

FIG. 2 is a block diagram of an exemplary embodiment of a data structure 2000;

DEFINITIONS

Figure 1:
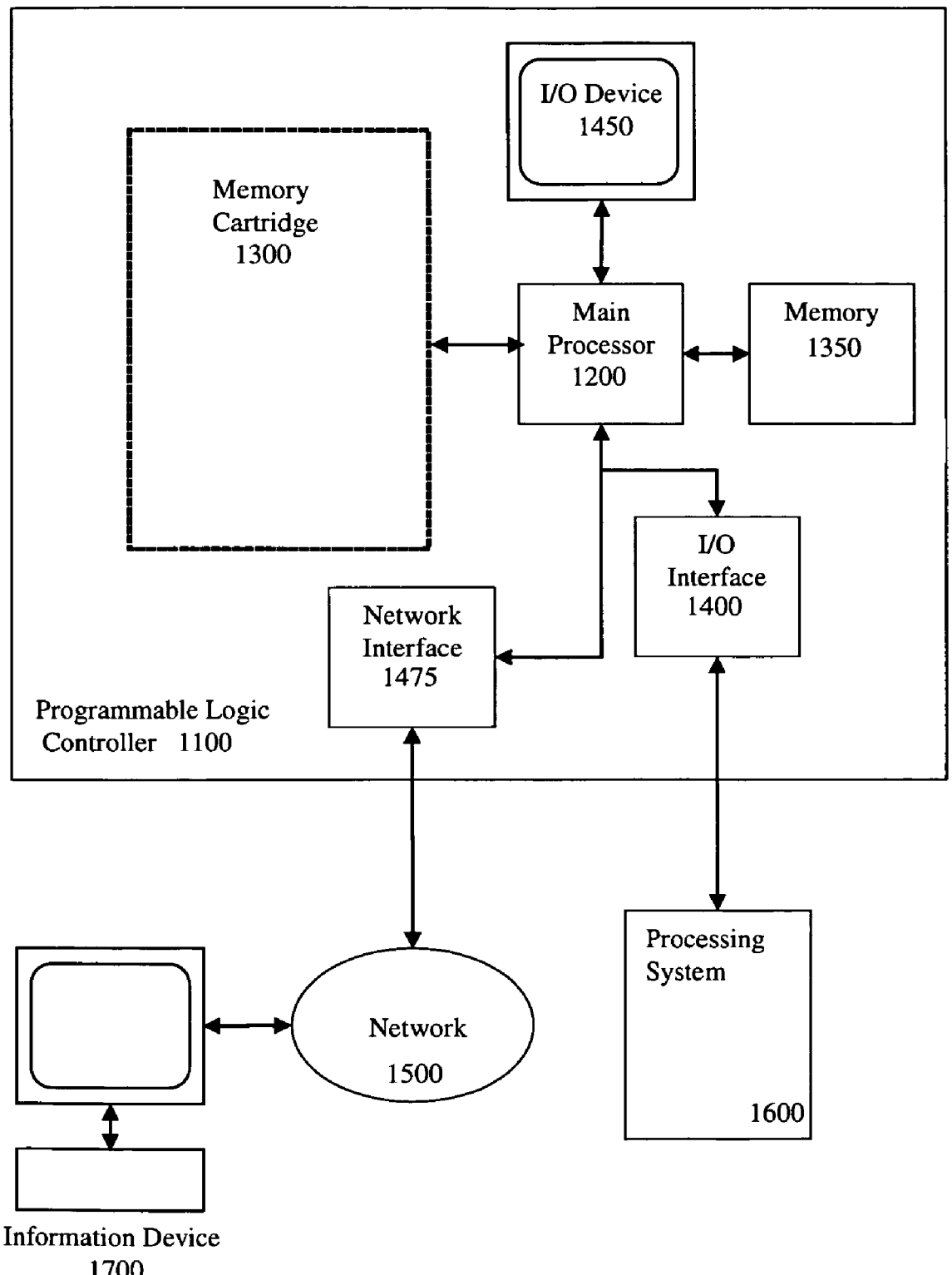
FIG. 1 block diagram of an exemplary embodiment of a system 1000.

When the following terms are used herein, the accompanying definitions apply:

adapted to—made suitable or fit for a specific use or situation.

apparatus—an appliance or device for a particular purpose.

activity—an action, act, step, and/or process or portion thereof.

acquire—to obtain or gain possession of.

acquiring—obtaining or gaining possession of.

adapted to—made suitable or fit for a specific use or situation.

adding—combining.

addition—an act of accumulating something.

additional—an act or process of adding.

apparatus—an appliance or device for a particular purpose.

associated—related to.

automatically—performed via an information device in a manner essentially independent of influence or control by a user.

can—is capable of, in at least some embodiments.

comprising—including but not limited to.

closest—logically nearest.

code—a system of symbols used to represent and/or indicate something. Code values can be used to fill record fields such as, for example, a record type field of a data log.

create—to cause to exist.

data—distinct pieces of information, usually formatted in a special or predetermined way and/or organized to express concepts.

data log—an organized group of records comprising gathered information.

define—to establish the outline, form, or structure of.

definition—a specification. For example, a data log definition can specify record formatting and/or a number of records.

detecting—the act of sensing or perceiving.

different—changed.

extra—additional to a requested and/or required amount.

field—a storage space for data. Fields contain textual, numeric, date, graphical, audio, video, and/or calculated data. Any text field has properties comprising a fixed or variable length, a pre-defined display format, and/or relatability to another field.

fill—introduce into; populate.

first record—an initial record of a plurality of records. When a data log is created, the first record can comprise a code of "head marker" in the record type field.

fully populated—a state wherein each of a plurality of fillable records comprises data.

head marker code—a byte or set of bytes coded into a record type field, the head marker code indicative of a data log location of a next record to be populated with process data.

identifying—recognizing or detecting.

incrementing—changing a value to point to a next logical record of a plurality of records.

information—numbers, characters, symbols etc., that are related to a subject.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, one or more user interfaces, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

initializing—setting to a default value or set of values.

instructions—directions adapted to perform a particular operation or function.

interact—receiving alerts or notifications, revising or switching programs, examining control algorithms, and/or modifying graphics displays, etc.

invalid—faulty and/or not valid.

invalid code—a byte or set of bytes coded into a record type field indicating that a record comprising the record type field is invalid.

invalidating—an act of determining information faulty or not valid.

known—recognized or understood.

last—a final item of a plurality of items.

logical—a sequential placement relative to other elements and/or identification of that sequential placement. In a plurality of records, the sequential identification can be considered as circular in that a physically first record of the plurality of records can logically follow a physically last record of the plurality of records.

logically—related to a sequential placement relative to other elements and/or identification of that sequential placement.

machine readable medium—a physical structure from which a machine can obtain data and/or information. Examples include a memory, punch cards, etc.

marked—denoted by a discernable symbol.

marking—an act of denoting by a discernable symbol.

may—is allowed to, in at least some embodiments.

memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.

memory cartridge—a non-destructively, repeatedly removable, and/or replaceable memory device.

memory device—any device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and can store instructions adapted to be executed by the processor according to an embodiment disclosed herein.

method—a process, procedure, and/or collection of related activities for accomplishing something.

MicroWin—PLC data management software adapted to download, classify, and/or archive information from sensors and/or instruments.

moving—transferring from one location to another.

near or [nearest]—logically closest.

network—a communicatively coupled plurality of nodes. A network can be a public, private, circuit-switched, packet-switched, virtual, radio, telephone, cellular, cable, DSL, satellite, microwave, AC power, twisted pair, ethernet, token ring, LAN, WAN, Internet, intranet, wireless, Wi-Fi, BlueTooth, Airport, 802.11a, 802.11b, 802.11g, and/or any equivalents thereof, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

new—having been made or coming into existence relatively recently as compared to something else.

newest—most temporally recent.

number—quantity.

oldest—occurring first in time.

organizing—placing and/or arranging in an order.

organization—a structural state or manner.

plurality—the state of being plural and/or more than one.

power interruption—a cessation and/or substantial aberration of a flow of electricity providing energy to a device and/or system.

preceding—taking place at a prior time.

predetermined—established in advance.

proceeding—to go forward or onward.

process—an organized activity. Examples of a process comprise:

materials conveying, materials pumping, materials manufacturing, heating systems, ventilating systems, air conditioning systems, chemical operations, mining, machining, packaging, and/or materials distribution, etc. A process can be monitored and/or controlled by a SCADA system.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

programmable logic controller (PLC)—a digitally operating electronic apparatus which uses a programmable memory for the internal storage of instructions for implementing specific functions such as logic, sequencing, timing, counting and arithmetic to control through digital or analog input/output modules, various types of machines or processes. See NEMA Standard ICS 3-1978, Part ICS3-304(5).

receive—acquire or obtain something.

record type—a field in a data log record. Exemplary values for the record type field comprise "valid," "invalid," and/or "head marker," etc.

reached—arrived at.

read—obtain from a memory device.

reading back—obtain from a memory device temporally soon after writing to the memory device.

receiving—obtaining and/or acquiring.

record—a collection of data elements. A set of records constitutes a file. For example, a personnel file might contain records that have data elements stored in three fields: a name field, an address field, and a phone number field. A group of records forms a database.

remove—to do away with and/or eliminate.

request—a message asking for something.

responsive—reacting to an influence and/or impetus.

set—a related plurality.

store—to place, hold, and/or retain data, typically in a memory.

stored—placed in a memory device.

substantially—to a great extent or degree.

system—a collection of mechanisms, devices, data, and/or instructions, the collection designed to perform one or more specific functions.

upload—to transfer from a first information device to a second information device.

uploaded—transferred from a first information device to a second information device.

uploading—transferring from a first information and/or memory device to a second information and/or memory device.

user—a person interfacing with an information device.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

valid—correct and/or sound.

valid code—a byte or set of bytes coded into a record type field indicating that a record comprising the record type field is valid.

verify—to test accuracy.

write—a coding of data on a memory device.

writing—placing data in a memory device.

written—placed in a memory device (e.g. data).

DETAIL DESCRIPTION

Certain exemplary embodiments comprise a method comprising a plurality of activities comprising: at a programmable logic controller comprising a memory device, receiving a request to create a data log that is adapted to receive data from a process; initializing the data log by writing to the data log a head marker code in the record type field of a first record and an invalid code in the record type field of a last record of the data log, the last record logically preceding and logically adjacent to the first record.

FIG. 1 is a block diagram of an exemplary embodiment of a system 1000. As illustrated, system 1000 can comprise a programmable logic controller (PLC) 1100. System 1000 can comprise a machine and/or process monitorable and/or controllable by PLC 1100. System 1000 can further comprise hardware and/or software adaptable to allow a user to communicate with PLC 1100. PLC 1100 can be used to monitor and/or control an industrial plant or processing system, such as a processing system 1600. PLC 1100 can be communicatively coupled to processing system 1600 via an I/O interface 1400. Processing system 1600 can comprise a machine tool, a robot, a chemical reactor, a stove, a furnace, an assembly machine, a packaging machine, and/or piece of conveying equipment, and/or associated instrumentation, sensors, relays, indicators, controllers, human interfaces, and/or actuators, etc. For example, PLC 1100 can monitor and/or control an alarms indicator, relay, sensor, another controller, and/or a motion device, such as a motion controller, such as a stepper motor controller, a servo controller, an actuator controller, etc.; a motion drive, such as a stepper drive, servo drive, etc.; and/or an actuator, such as a stepper motor, servomotor, linear motor, motor, ball screw, servo valve, hydraulic actuator, pneumatic valve, etc.

PLC 1100 can include a central processing unit (CPU) via which instructions are processed and appropriate control signals determined. PLC 1100 can further comprise and/or be coupled to an input-output (I/O) device 1450. I/O device 1450 can render information obtained from PLC 1100. The user also can interact with PLC 1100 via the I/O device.

A memory device, such as a memory cartridge 1300 can be a part of PLC 1100 and/or couplable to PLC 1100 either directly or via a network. In certain exemplary embodiments, memory cartridge 1300 can be a insertable into and/or connectable to PLC 1100. Memory cartridge 1300 can provide storage for instructions and/or data usable by a main processor 1200 of PLC 1100. PLC 1100 can comprise a memory such as memory 1350. Memory 1350 can provide storage for instructions, recipes, and/or storage protocols, etc.

In an exemplary embodiment, PLC 1100 can be couplable to one or more of a plurality of information devices, such as an information device 1700 via a network 1500. PLC 1100 can be communicable with information device 1700 via a network interface device 1475. Via network interface device 1475 the user to communicate with PLC 1100 while located remotely from the PLC 1100.

Information device 1700 can comprise user interface components such as a visual output device such as a cathode ray tube. Information device 1700 can comprise any common input device such as a keyboard, mouse, touch screen, and/or digitizing pad, etc. Via information device 1700, the user can interact with PLC 1100. Utilizing information device 1700, the user can monitor a process, connectable to and/or controllable by PLC 1100. The user can also interact with PLC 1100 via information device 1700.

Network 1500 can allow the user to interact with PLC 1100 from a location hundreds or even thousands of miles away from PLC 1100. Network 1500 can be usable to enhance availability and reduce programming, managerial, and/or maintenance costs attributable to PLC 1100 and/or the monitoring and/or control of processing system 1600. Processing system 1600 can comprise a plurality of process elements.

FIG. 2 is a block diagram of an exemplary embodiment of a data structure 2000. An exemplary embodiment of data structure 2000 can comprise a file 2100. File 2100 can be storable on a memory device, such as the memory cartridge. File 2100 can comprise a plurality of records, such as record 2200 and record 2300, which comprise a plurality of data. File 2100 can define a plurality of fields that can contain and/or store the data of the records of file 2100. Record 2200 and record 2300 can comprise temporal fields such as a date field and/or a time field. Record 2200 and record 2300 can comprise data such as process data. Record 2200 and record 2300 can comprise a checksum field for a value adapted to improve information transfer and/or recording reliability. Record 2200 and record 2300 can comprise a record type. In certain exemplary embodiments the record type can comprise values such as a code indicative of valid data, such as 01. The record type can comprise values such as a code indicative of invalid data, such as 00. The record type can comprise a code indicative of a head marker, such as 02. The head marker can be indicative of a record that will receive the data of a next record to be written to file 2100. The head marker can be indicative of a starting point for uploading data from file 2100 to an information device. In certain exemplary embodiments, record 2300 can be logically adjacent to record 2200 even if record 2200 and record 2300 are not physically adjacent.

Figure 3:
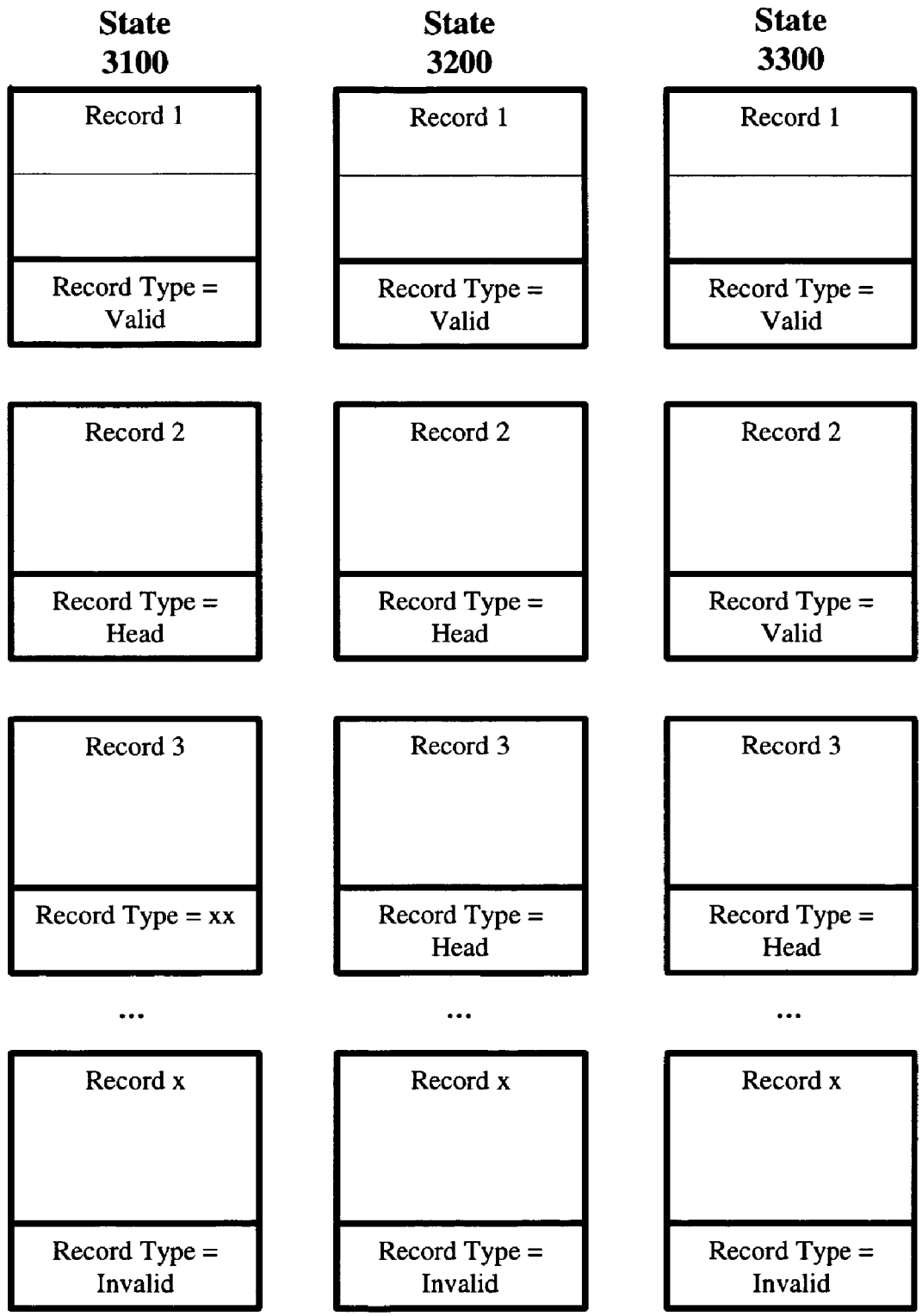
FIG. 3 is a sequence of states of a plurality of records 3000.

FIG. 3 is a sequence of states of a plurality of records 3000. Plurality of records 3000 can comprise records in state 3100 at a first point in time. At a later second time, records 3000 can comprise records in state 3200. At a still later third time, records 3000 can comprise records in state 3300. Progressing from state 3100 to state 3200 to state 3300 can be indicative of a process for writing data to at least one field of Record 2. At state 3100, plurality of records 3000 can comprise Record 1, which comprises a record type code indicative that Record 1 comprises valid data. At state 3100, Record 2 comprises a record type code indicative of a head marker—thereby indicating that Record 2 comprises invalid data. At state 3100, Record 3 and records between Record 3 and Record "x-1" can comprise an undefined record type. The undefined record type can be used to initialize the plurality of records. The undefined record type can automatically indicate that Record 3 and records between Record 3 and Record "x-1" do not comprise valid data. At state 3100, Record x can comprise an invalid record type code. Record x can be considered to be logically adjacent to Record 1 in a logically circular data log. If an invalid code is found in the record type field in Record x, records logically between Record x and the first record comprising a head marker code in the record type field—Record 2 in this embodiment—are valid.

Records 3000 can comprise records in state 3200 at a second point in time. At state 3200, Record 1 can comprise a record type code indicative of the record comprising valid data. At state 3200, Record 2 can comprise a record type code indicative of a head marker—thereby indicating that record 2 comprises invalid data. At state 3200 Record 3, can comprise a record type code indicative of a head marker—thereby indicating that record 3 comprises invalid data. Placing a record type code of head marker in record 3 can be a step to allow record 2 to be overwritten with valid data while providing that at least one record of the plurality of records in this embodiment comprises a head marker code in the record type field. Should power fail with the plurality of records in state 3200, a scan of the records would reveal two head marker codes. The head marker code in record 2 can be considered the valid head marker. The head marker code in record 3 can either be ignored or overwritten with a record type code of invalid. In this way, one record of data might be lost in event of a power failure without affecting valid records, such as Record 1, stored in records 3000. At state 3200, a plurality of records between Record 3 and Record "x-1 can comprise an undefined record type. The undefined record type can be used to initialize the plurality of records. The undefined record type can automatically indicate that records between Record 3 and Record "x-1" do not comprise valid data. At state 3200, Record x can comprise an invalid record type code.

Records 3000 can comprise records in state 3300 at a third point in time. At state 3300, Record 1 can comprise a record type code indicative of the record comprising valid data. At state 3300, Record 2 can comprise a record type code indicative of valid—thereby indicating that valid data has been written to Record 2 during the time interval between state 3200 and state 3300. At state 3300, Record 3 can comprise a record type code indicative of a head marker—thereby indicating that Record 3 comprises invalid data. At state 3300, a plurality of records following Record 3 and continuing through Record "x-1 can comprise an undefined record type. The undefined record type can be used to initialize the plurality of records. The undefined record type can automatically indicate that records between Record 3 and Record "x-1" do not comprise valid data. At state 3200, Record x can comprise an invalid record type code.

Overwriting the record type of head marker in Record 2 between state 3200 and state 3300 can provide a degree of fault tolerance to records 3000. If power is lost to the programmable logic controller between state 3200 and state 3300 before the head marker record type code in Record 2 is overwritten, only the data that would have been written to Record 2 will be lost. Remaining records comprising valid data, such as Record 1 can still be read from records 3000.

A sequence of states such as state 3100, state 3200, and state 3300 can be iteratively continued until and/or beyond a state wherein all records comprise data except for a record with a record type code of a head marker. If continued beyond the state wherein all records comprise data except for a record with a record type code of a head marker, the plurality of records can be circular in the sense that newest records can progressively overwrite oldest record in the plurality of records—thereby successively advancing the record that comprises a head marker code in the record type field.

Figure 4:
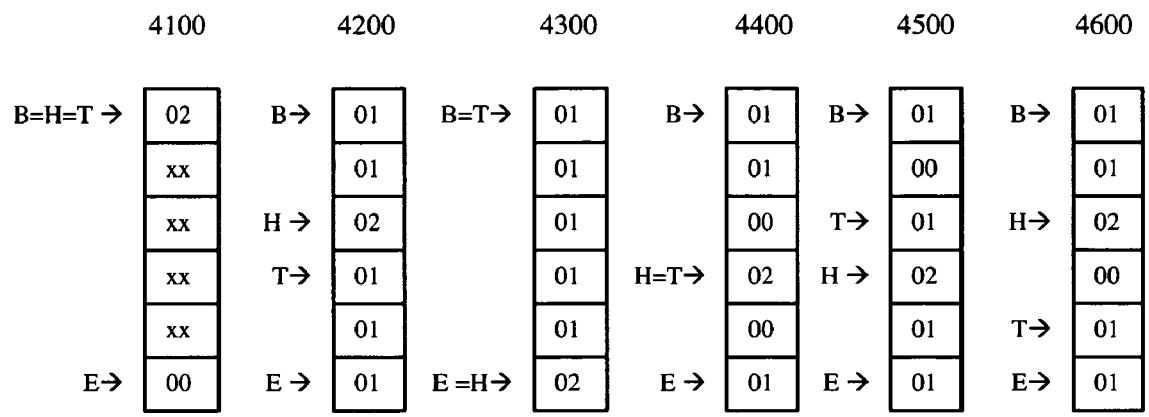
FIG. 4 is a sequence of states of plurality of records 4000.

FIG. 4 is a sequence of states of plurality of records 4000. Plurality of records 4000 can be described by a series of non-sequential states such as state 4100, state 4200, state 4300, state 4400, and state 4500. In certain exemplary embodiments, a set of pointers can be used. Using pointers can improve access and write times related to plurality of records 4000. Pointers can provide a programmable logic controller with relatively efficient access to an absolute or relative location of plurality of records 4000 in a particular memory device associated with a programmable logic controller. Pointers can comprise a beginning pointer, ending pointer, head pointer, and/or tail pointer, etc.

The beginning pointer can indicate a location of a first physical and/or logical record of plurality of records 4000. Once defined, the beginning pointer can remain set so long as plurality of records 4000 remains defined without change in the particular memory device. The end pointer can indicate a location of a last physical and/or logical record of plurality of records 4000. Once defined, the ending pointer can remain set so long as plurality of records 4000 remains defined without change in the particular memory device.

The head pointer of plurality of records 4000 can be used to point to a record comprising a code indicative of a head marker record type. The record pointed to by the head pointer can be a next location wherein data from sensors and/or instruments associated with a process can be stored. The head pointer and/or head marker can be advanced by one logical position, in pointing to a record of plurality of records 4000, each time data is written to fill a next record.

The tail pointer of plurality of records 4000 can be used to point to a record that is temporally oldest among plurality of records 4000. Alternatively when plurality of records 4000 is first defined, the tail pointer can indicate a logically first record of plurality of records 4000. The tail pointer can be advanced by one logical position, in pointing to a record of plurality of records 4000, each time data is written to fill a next record once all records comprise data. Certain exemplary embodiments do not move the tail pointer until all records comprise valid data and the programmable logic controller begins to overwrite previous records.

At state 4100, plurality of records 4000 can be initially defined and as illustrated does not comprise process data in any of plurality of records 4000. The beginning pointer, the head pointer, and the tail pointer, if pointers are used, can each be defined to point to a first record of a logically contiguous plurality of records 4000. A record type code of "02" can be stored in the first record, which can be indicative of a head marker in the first record. The end pointer, if used, can be indicative of a last logical record in plurality of records 4000. A record type code of "00" can be stored in the last record, which can be indicative of an invalid record being present in the last logical record. In certain exemplary embodiments a number of valid records of plurality of records 4000 can be determined by a logical number of records between the record comprising the head marker code in the record type field and a nearest logically preceding record comprising an invalid code in the record type field. At state 4100, if the invalid code is in a cell logically immediately preceding the record comprising the head marker code in the record type field, plurality of records 4000 might not comprise any valid records.

At state 4200, plurality of records 4000 can be fully populated with process data. At state 4200 the beginning pointer, if used, can continue to indicate a physically and/or logically first record of plurality of records 4000. The ending pointer, if used, can continue to indicate a physically and/or logically last record of plurality of records 4000. The head pointer, if used, can point at a next location—indicated as the third of the list of six records illustrated in this particular embodiment—wherein process data can be written. The record pointed to by the head pointer comprises a code of "02," which can be indicative of a head marker in the record type field of the record, thereby automatically invalidating the record comprising the head maker code. Since plurality of records 4000 comprises no invalid codes in the record type fields, plurality of records 4000 can be considered as fully populated with data with the exception of the automatically invalid record comprising the head marker code. The tail pointer, if used, can mark a location—indicated as the fourth of the list of six records illustrated in this particular embodiment—wherein an oldest present record is written. In the particular embodiment illustrated in states 4200, all records except for the record associated with the head marker can comprise a code of "01" in the respective record type field, which can be indicative of a valid record.

As state 4300, plurality of records 4000 can be fully populated with process data. At state 4300 the beginning pointer, if used, can continue to indicate a physically and/or logically first record of plurality of records 4000. The ending pointer, if used, can continue to indicate a physically and/or logically last record of plurality of records 4000. The head pointer can point at a next location (indicated as the sixth of the list of six records illustrated in this particular embodiment) wherein process data can be written. The record pointed to by the head pointer comprises a code of "02," which can be indicative of a head marker in the record type field of the record. The tail marker can mark a location (indicated as the first of the list of six records illustrated in this particular embodiment) wherein an oldest present record is written. In the particular embodiment illustrated in state 4300, all records except for the record associated with the head marker can comprise a code of "01" in the respective record type field, which can be indicative of valid records. In a circular data log, when a request is received to write a next record to the data log, the head marker code can be written to the first logical record of plurality of records 4000, thereby invalidating the first logical record.

At state 4400, plurality of records 4000 can comprise one or more invalid records. An invalid record can be determined by locating a value of "00" in a record type field of plurality of records 4000 (such as the value illustrated in the second cell of the plurality of records in the illustrated embodiment). The invalid record code can provide a user with information indicative that a particular record is invalid. For example, data denoted by the record type as invalid can be excluded from statistical and/or graphical analyses of plurality of records 4000.

At state 4400, plurality of records 4000 can be in a state following an uploading of plurality of records 4000 with instructions to erase plurality of records 4000 after uploading. In certain exemplary embodiments, state 4400 can occur as a result of a power failure. In certain exemplary embodiments, state 4400 can occur as a result of a memory cartridge of an unknown state being placed in a programmable logic controller. An initial search can be made of the record type field to locate the record comprising a head marker code in the record type field—in this case in the fourth record from the logical beginning of plurality of records 4000. The head pointer, if used, can be assigned to point to this record. A search of the record type fields at state 4400 reveals two invalid record codes. The closest invalid record code preceding the record comprising the head marker code can indicate that no valid records are available and that the data log is effectively empty. Responsive to locating the invalid record code in the third record from the logical beginning of plurality of records 4000, the tail pointer, if used, can be set to point to the same record as pointed to by the head pointer. In certain exemplary embodiments, if a data log is to be erased after an uploading operation has been completed, an invalid record code can be placed in a record immediately preceding the record comprising the head marker. The tail pointer, if used, can then be set to point to the record comprising the head marker.

At state 4500, plurality of records 4000 can comprise a single invalid code in the second record from the logical beginning of plurality of records 4000. After adding a valid record to the third cell, the tail pointer, if used, can be assigned to point to the valid record as the oldest valid record in plurality of records 4000. The head marker code can be found, in this particular embodiment, in the record type field of the fourth record.

At state 4600, plurality of records 4000 can be partially filled. The particular embodiment illustrated indicates four valid records, one invalid record, and a head marker in the record type fields of plurality of records 4000. The tail pointer, if used, can be pointed at an oldest record, which happens to be in a logical location immediately following a record comprising a record type code of invalid. A next group of process data to be recorded to a record can be placed in the cell indicated by the head pointer, if used, once the head pointer and head marker have been incremented. Since the head pointer and the tail pointer, if used, do not point to consecutively numbered records, data can be added to a next record without incrementing the tail pointer.

Figure 5:
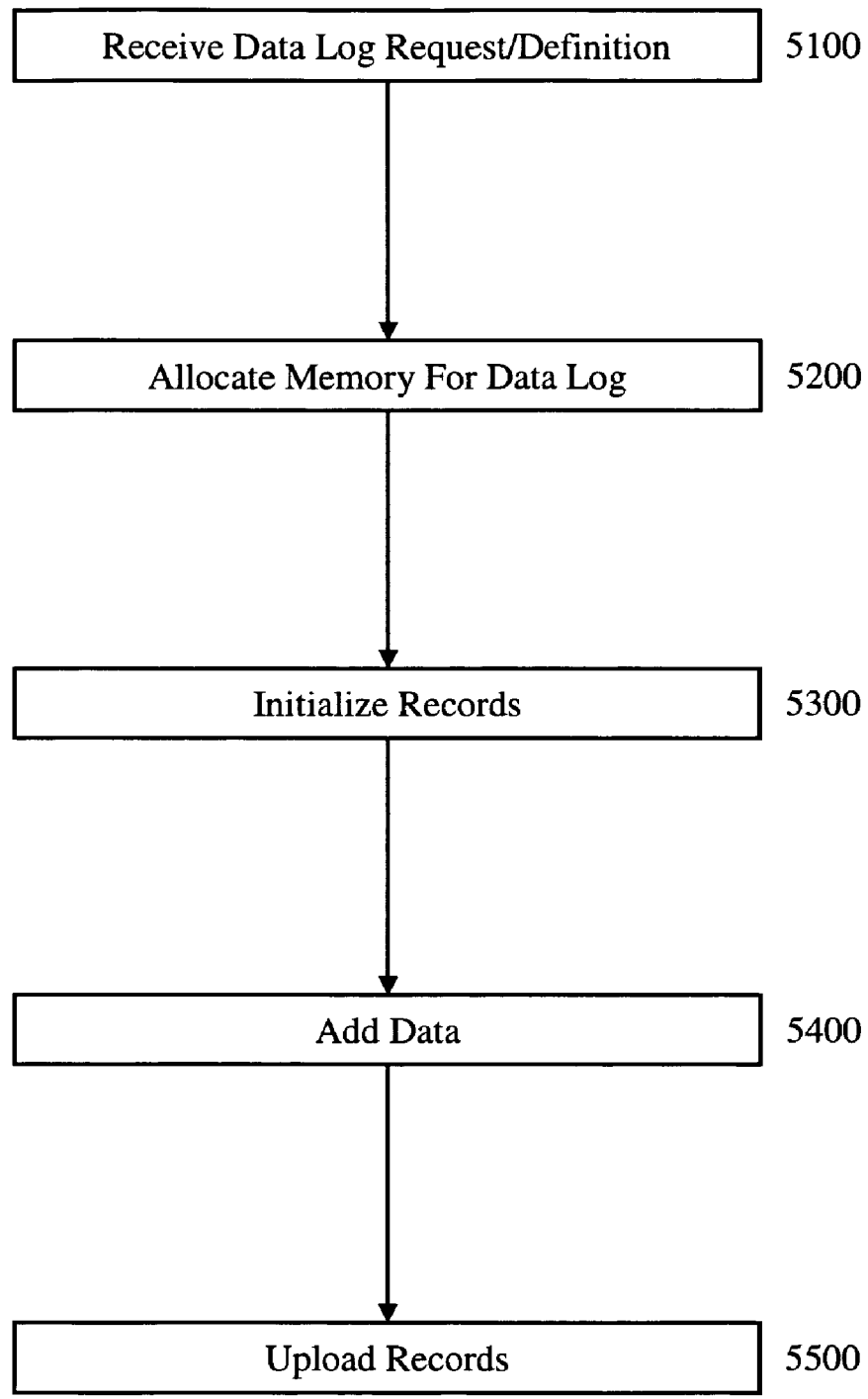
FIG. 5 is a flowchart of an exemplary embodiment of a method 5000.

FIG. 5 is a flowchart of an exemplary embodiment of a method 5000 for using the memory device. In certain exemplary embodiments, at activity 5100, a request and/or definition can be received at a programmable logic controller for creating a data log file. The request can be from a user of the programmable logic controller. The request can be initiated by a user of the programmable logic controller. The user can request data collection from a plant and/or process utilizing the programmable logic controller. Responsive to the user request, a memory device, such as a memory cartridge, can be initialized to obtain and/or collect data requested by the user. The amount of collected data can be user-specified in any of numerous fashions, such as an amount of time over which to collect data, an amount of memory to fill, a number of data records to collect, etc. In certain exemplary embodiments a data log definition can be received at a programmable logic controller to create a data log file. The data log definition can be generated responsive to the user request and/or can be automatically generated by the programmable logic controller.

At activity 5200, a block of memory of a memory device can be allocated for the data log. The block of memory can be allocated responsive to a user request and/or automatically. Memory can be allocated to comprise a predetermined plurality of records. The memory device can be organized to hold the predetermined plurality of records. Each record can comprise a record type field, which is a field that indicates whether the record is a valid record, an invalid record, and/or a "head" record (indicated by a "head marker" code in the record type field). In certain exemplary embodiments, records can comprise a date stamp, time stamp, identifier, process unit identifier, machine stamp, sensor number, and actuator number, and/or data field, etc. The block of memory can be allocated to comprise one record more than desired for data storage in order to accommodate an automatically invalid record comprising a code indicative of a head maker record type. Searching the block of memory can identify an invalid record and/or a valid record.

In an exemplary embodiment, the data log file can be written in a logically circular buffer. The logically circular buffer can be characterized by data log records written to contiguous memory segments, the buffer commencing at a beginning memory segment. The logically circular buffer can be further characterized by the writing of the next data log record at the beginning of the buffer when the buffer is full. The next data log record can overwrite an oldest data log record written in the logically circular buffer. For example, if the buffer is full, the next data log record to be written can be written at the beginning of the buffer, thereby overwriting the data log record that was previously at the beginning of the buffer. The logically circular buffer can comprise a circular buffer wherein memory segments are physically contiguous to each other.

At activity 5300, a the plurality of records can be initialized. For example, the first record can be initialized by placing a code indicative of a head marker in the record type field—thereby automatically invalidating the first record. A last record of the plurality of records can be initialized by placing a code indicative of an invalid record in the record type field. The predetermined plurality of records can be logically circular in that the last record can be logically adjacent to the first record.

If pointers or used, activity 5300 can comprise defining pointers. Pointers associated with the plurality of records can comprise a beginning pointer, ending pointer, head pointer, and/or tail pointer, etc. Pointers can be used to quickly and efficiently direct an information device to a record to be written to and/or uploaded from. Upon an initial creation of the plurality of records, the beginning record pointer, the head pointer, and/or the tail pointer can be associated with a first record in a logical sequence of the plurality of records. The ending record pointer can be initially associated with a last record in the logical sequence of the plurality of records.

At activity 5400, an instruction and/or directive can be executed to add plant and/or process data to the plurality of records. The instruction and/or directive can be a part of a plurality of machine readable instructions resident on a programmable logic controller. The instruction can comprise obtaining and or formatting data to fill at least one of the plurality of records. Responsive to an instruction to add data to the first record, the code indicative of the head marker can be written to the record type field of a second record logically incremented from the first record.

Data can be acquired from the plant and/or process to fill at least one field of the first record. Once filled with data the first record can be considered as a most recently filled record. The first record can be the first record read in an uploading event, should such an event occur before new data is added to another of the plurality of records. If pointers are used, pointers can be incremented responsive to data added to the first record. The head pointer can be incremented to be associated with the second record. If the head pointer and the tail pointer are equal after the head pointer has been advanced to point to the second record, then the tail pointer can be changed to point at a third record that can be the next record logically after the second record.

To verify that a proper writing of data has occurred, the record types of the first and/or second record can be read back by the programmable logic controller. Verifying that the first record comprises a non-head marker record type and that the second record comprises a head marker record type can verify that a write operation adding data to the plurality of records has been successfully completed. In certain exemplary embodiments, the programmable logic controller can read a plurality of record type fields from the plurality of records to assure the presence of a single head marker after the power failure via an error checking technique. The error checking technique can be an ones complement method, a Fletcher checksum method, a cyclic redundancy check method, and/or extended-precision checksum method, etc. The error checking technique, possibly coupled with knowledge of the position of the records in question and/or the position and/or direction that records are added to the memory device, can identify which record is the most recent, and thereby which head marker is erroneous if more than one head marker is detected.

In an operative embodiment, the PLC can disable and/or eliminate the older, duplicate head marker, or possibly convert the older, duplicate head marker to a non-head marker resulting in the presence of a single head marker in the data log file, that single head marker corresponding to a record which will receive the next data from the plant and/or process. Changing the value of a binary bit can disable the older, duplicate head marker. Alternatively, the PLC can inspect and test a marker, such as a time stamp marker, on each of the data log records, to determine the most recently written record. In certain operative embodiments a time to write a record to a data log can be measured as being between two and three cache writing cycles to a serial eeprom memory device. The time to write the record can be less than 40 ms.

At activity 5500, instructions can be executed to upload records from the plurality of records. The instructions can be from a user and/or automatically generated by the programmable logic controller. The instructions can be based upon a scheduled time, scheduled amount of data collected, and/or a specific user request, etc. The instructions can comprise a setting corresponding to an instruction to erase or to not erase the data log from the memory device after the data log is uploaded. The instruction to erase or not erase the data log file subsequent to reading the data log file can allow a user to more effectively manage data storage and retrieval on the memory device. Erasing the data log file can provide an assurance that no data log record on the memory device has been previously read. Data log records can be uploaded beginning with a record logically preceding the record pointed to by the head pointer and comprising the code indicative of the head marker data type. Uploading data can continue on a record by record basis beginning with a newest record until the oldest record is reached, which will be associated with the tail pointer if pointers are used. The tail pointer, if used, can point to an oldest record in the plurality of records once data has been provided to at least one record of the plurality of records.

In certain operative embodiments, a new record addition can be requested during activity 5500. Responsive to the new record addition, a record type code of invalid can be assigned to an uploaded record that comprises data associated with the new record addition request. The new record can be added by writing a head marker code to a record type field of a second record of the plurality of records responsive to the request to add the new record. Data can be written to at least one field of the first record of the plurality of records. A valid code can be written to the record type field of the first record. The new record can be uploaded as a valid record during a subsequent execution of activity 5500.

Activity 5500 can comprise, responsive to instructions to remove uploaded records from the plurality of records, record type fields and/or pointers can be reset. In certain exemplary embodiments, the record immediately preceding the head marker code can be assigned an invalid code as a record type. The tail pointer, if used, can then be set equal to the head pointer, if used, and hence to point to a record logically incremented by one from the closest preceding record comprising and invalid code. Thus, previously stored records from the plurality of records can be effectively erased by only changing a small number, such as one or two, record type fields in the plurality of records.

Figure 6:
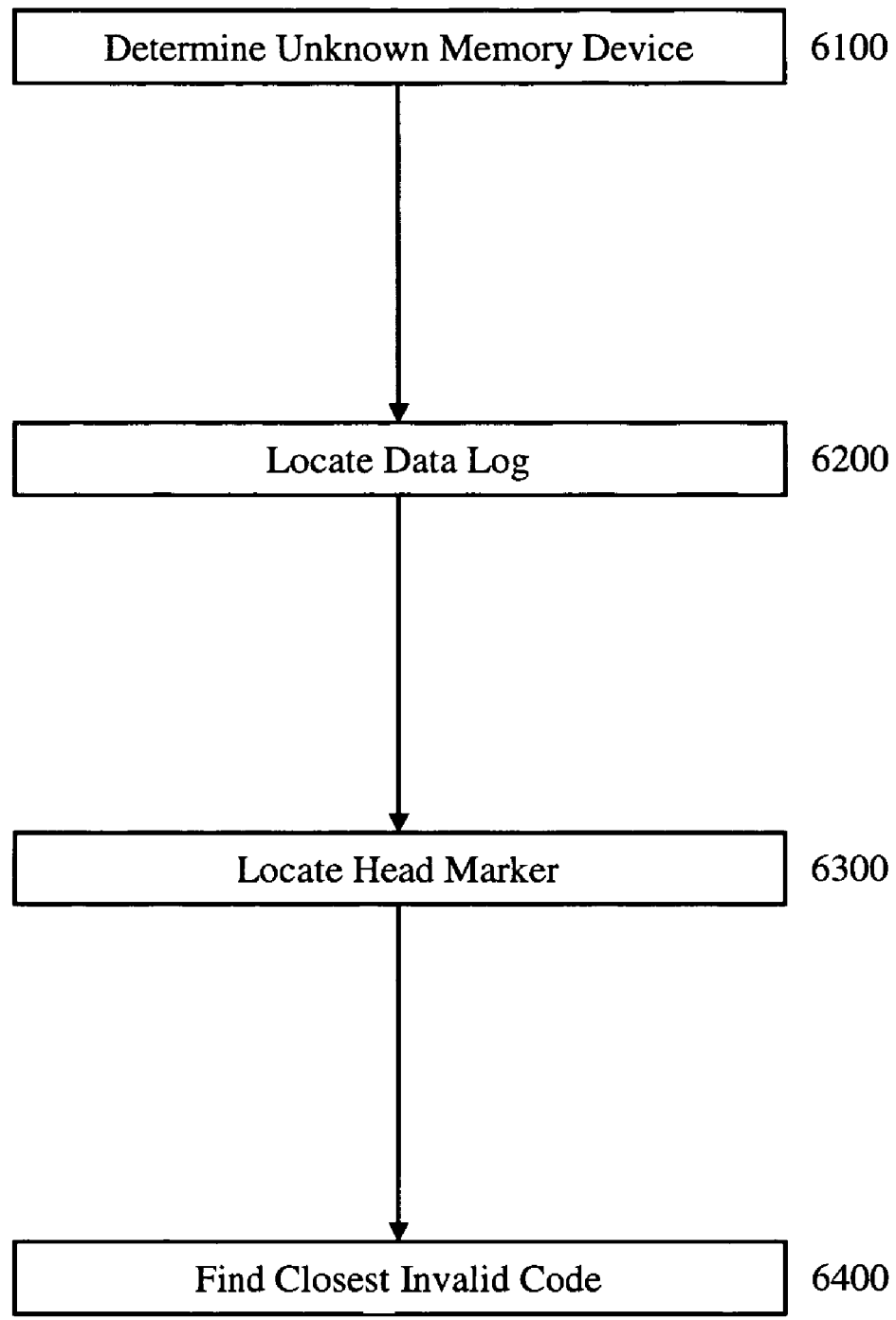
FIG. 6 is a flowchart of an exemplary embodiment of a method 6000.

FIG. 6 is a flowchart of an exemplary embodiment of a method 6000. At activity 6100, a programmable logic controller can detect a memory device. The programmable logic controller can determine that the organization of the memory device is unknown to the programmable controller. The programmable logic controller can detect the memory device after returning to operation after a power failure. In certain exemplary embodiments, the memory device can be a memory cartridge newly placed and/or replaced in the programmable logic controller by a user. A replaceable memory cartridge can be used to transfer programs and/or recipes between programmable logic controllers. Data cartridges can be changed without losing data comprised and/or stored on the memory cartridge. Data cartridges can be changed to upload data from the data log to a customer information device. Changing a data cartridge to upload data can allow a customer to transfer data from the data log without having the programmable logic controller connected to a same network as the customer information device.

At activity 6200, a data log can be located on the memory device. The data log can comprise a plurality of records. Each record can comprise a record type field. A code can be placed in the record type field indicative of a head marker, invalid data, undefined data, and/or valid data, etc.

At activity 6300, the data log can be searched for records comprising a head marker code in the record type field. If no record comprises a head marker code, a default record such as a first logical record can be assigned the head marker code. In certain exemplary embodiments if a plurality of records comprise head marker codes, all head marker codes can be changed to invalid codes except a logically first record comprising the head marker code. In certain exemplary embodiments, the logically first record comprising the head marker code can be pointed to as the next record to receive plant and/or process data. The logically first record can be automatically invalidated. In certain exemplary embodiments, the logically first record can be adapted to receive plant and/or process data without changing record type fields of other records comprising head marker codes. In certain exemplary embodiments, a head pointer can be defined that improves access to the logically first record by the programmable logic controller. Activity 6300 can assure that plant and/or process data is stored at a proper location in the data log.

At activity 6400, the data log can be searched for a record comprising an invalid code. The search can comprise scanning the record type field of each record. A record that comprises an invalid code can be found as a result of searching the records. If more than one record comprises the invalid code, a closest record logically preceding the record comprising the head marker can be found. If any records exist between the record comprising the invalid code and the record comprising the head marker, those records can be considered to comprise valid data. If an invalid code is found and the data log comprises valid data, an oldest record can be a record logically following the closest record found in activity 6300. In certain exemplary embodiments a tail pointer, if used, can be defined to point to the oldest valid record.

If no records comprise an invalid code for a record type, all records except the record comprising the head marker can be considered to comprise valid data. The oldest record can be a record immediately following the record comprising the head marker. If pointers are used, the tail pointer can be defined to point to the record immediately following the record comprising the head marker.

Figure 7:
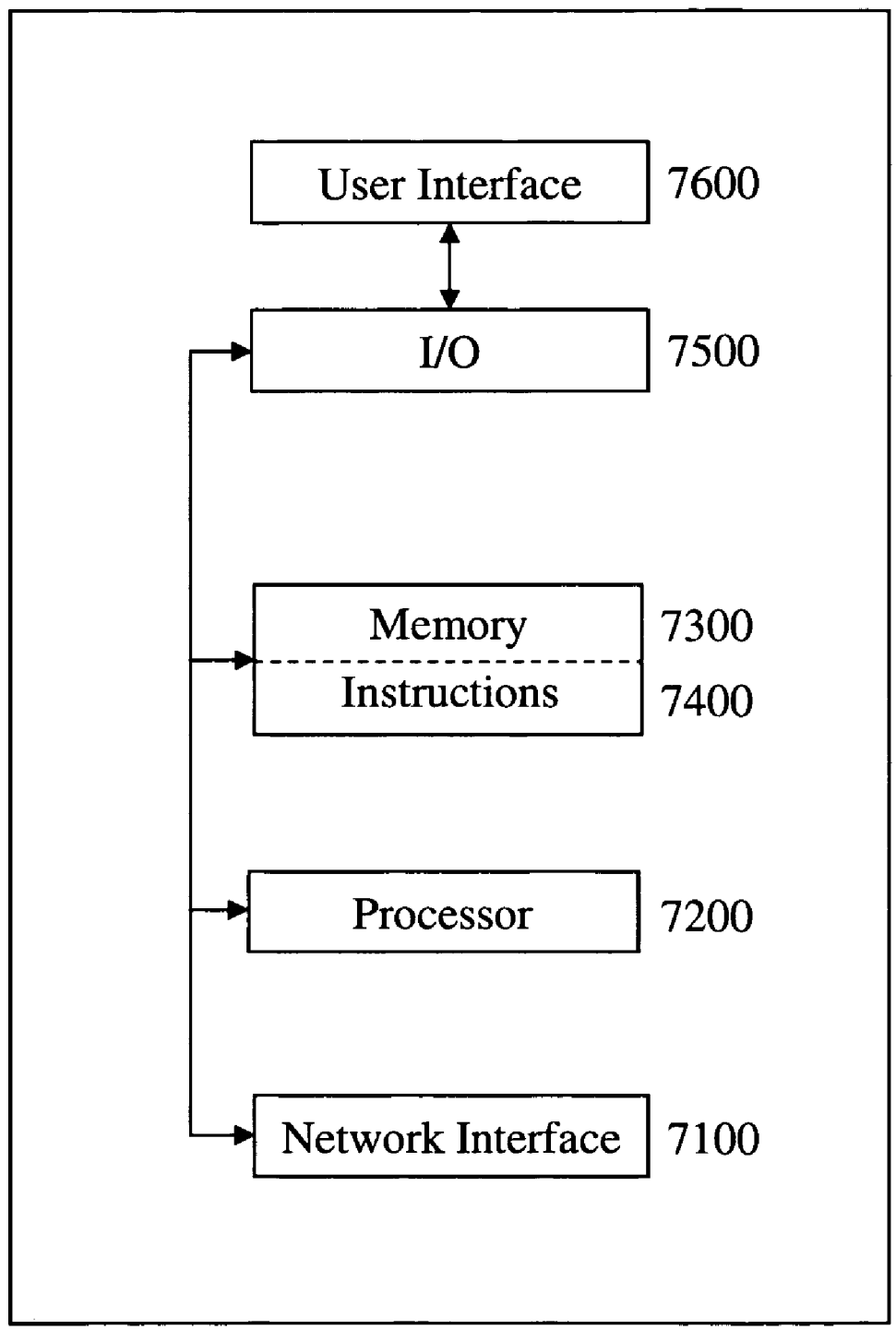
FIG. 7 is a block diagram of an exemplary embodiment of an information device 7000.

FIG. 7 is a block diagram of an exemplary embodiment of an information device 7000, which in certain operative embodiments can comprise, for example, information device 1700 of FIG. 1. Information device 7000 can comprise any of numerous well-known components, such as for example, one or more network interfaces 7100, one or more processors 7200, one or more memories 7300 containing instructions 7400, one or more input/output (I/O) devices 7500, and/or one or more user interfaces 7600 coupled to I/O device 7500, etc.

In certain exemplary embodiments, via one or more user interfaces 7600, such as a graphical user interface, a user can view a rendering of information related to defining, storing, and/or uploading data from a data log.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method for managing the storage of data, the method comprising:

at a programmable logic controller comprising a memory device, receiving a request to create a data log comprising a plurality of records, the data log adapted to receive data from a process, each record comprising a record type field;

initializing the data log by performing the following steps:
writing, in the record type field of a first record of the data log, a head marker code that indicates that the first record comprises invalid data; and
writing, in the record type field of a last record of the data log, a second code that indicates that the last record comprises invalid data, the second code being different from the head marker code, the last record logically preceding and adjacent to the first record;

responsive to a determination that the record type code of the first record is indicative of a head marker, automatically invalidating the first record;

writing a second head marker code in a second record that is logically adjacent the first record and that logically succeeds the first record, the second head marker code indicating that the second record comprises invalid data;

writing valid data in the first record; and overwriting the head marker code in the first record with a third code that indicates that the first record comprises valid data.

2. The method of claim 1, further comprising:
organizing the memory device to hold the plurality of records plus an additional record.

3. The method of claim 1, further comprising:
identifying an invalid record via the record type field.

4. The method of claim 1, further comprising:
identifying a valid record via the record type field.

5. The method of claim 1, further comprising:
writing the second head marker code in the second record responsive to acquiring data to fill the first record.

6. The method of claim 1, further comprising:
overwriting an oldest record of the plurality of records.

7. The method of claim 1, further comprising:
reading back the record type field from the second record to verify that a write to the second record has occurred.

8. The method of claim 1, further comprising:
uploading at least one of the plurality of records from the memory device.

9. The method of claim 1, further comprising:
uploading at least one of the plurality of records from the memory device, wherein said uploading activity comprises reading a record logically preceding a record comprising the head marker code in the record type field.

10. The method of claim 1, further comprising:

uploading at least one of the plurality of records from the memory device, wherein said uploading activity begins with a newest record and continues until an oldest record comprising a valid code in the record type field is reached.

11. The method of claim 1, further comprising:

uploading at least one of the plurality of records from the memory device; and if a new record addition is requested during said uploading activity, assigning a record type code of invalid in an uploaded record that comprises data associated with the new record addition request.

12. The method of claim 1, further comprising:

uploading at least one of the plurality of records from the memory device; and writing the second head marker code in the second record, writing valid data in the first record, and overwriting the head marker code in the first record with the third code, if a new record addition is requested during said uploading activity.

13. A machine-readable medium comprising stored machine-executable instructions adapted for:

at a programmable logic controller comprising a memory device, receiving a request to create a data log comprising a plurality of records, the data log adapted to receive data from a process, each record comprising a record type field;

initializing the data log by performing the following steps:
writing, in the record type field of a first record of the data log, a head marker code that indicates that the first record comprises invalid data; and
writing, in the record type field of a last record of the data log, a second code that indicates that the last record comprises invalid data, the second code being different from the head marker code, the last record logically preceding and adjacent to the first record;

automatically invalidating the first record;

writing a second head marker code in a second record that is logically adjacent the first record and that logically succeeds the first record, the second head marker code indicating that the second record comprises invalid data;

writing valid data in the first record; and overwriting the head marker code in the first record with a third code that indicates that the first record comprises valid data.

* * * * *